US009062964B1

(12) United States Patent
Arabi

(10) Patent No.: US 9,062,964 B1
(45) Date of Patent: Jun. 23, 2015

(54) LASER CALIPER MEASUREMENT OF PAPER MATERIAL

(75) Inventor: Michael Arabi, Lewiston, ID (US)

(73) Assignee: Clearwater Paper Corporation, Spokane, WA (US)

( * ) Notice: Subject to any disclaimer, the term of this patent is extended or adjusted under 35 U.S.C. 154(b) by 343 days.

(21) Appl. No.: 13/465,852

(22) Filed: May 7, 2012

(51) Int. Cl.
*G01B 11/28* (2006.01)
*G01B 11/06* (2006.01)
*G01B 11/30* (2006.01)

(52) U.S. Cl.
CPC .......... *G01B 11/0691* (2013.01); *G01B 11/303* (2013.01)

(58) Field of Classification Search
CPC ........... G01B 2210/42; G01B 11/0691; G01B 5/068; G01B 11/245
USPC .................................................. 356/630–632
See application file for complete search history.

(56) References Cited

U.S. PATENT DOCUMENTS

| | | | | |
|---|---|---|---|---|
| 4,311,392 A * | 1/1982 | Yazaki et al. | ................. | 356/631 |
| 4,499,383 A * | 2/1985 | Loose | ...................... | 250/559.36 |
| 5,140,239 A * | 8/1992 | Matsuura | ...................... | 318/577 |
| 5,569,835 A * | 10/1996 | Kenney et al. | ................. | 73/1.81 |
| 5,581,353 A | 12/1996 | Taylor | | |
| 5,714,763 A * | 2/1998 | Chase et al. | ............... | 250/559.3 |
| 5,761,999 A * | 6/1998 | Lippold et al. | ................ | 101/484 |
| 5,805,291 A * | 9/1998 | Calvin et al. | .................... | 356/429 |
| 6,281,679 B1 | 8/2001 | King et al. | | |
| 6,891,629 B2 * | 5/2005 | Jackson | ........................ | 356/630 |
| 7,199,884 B2 | 4/2007 | Jasinski et al. | | |
| 7,528,400 B2 | 5/2009 | Duck et al. | | |
| 7,768,629 B2 * | 8/2010 | Typpo et al. | ................. | 356/4.01 |
| 7,956,999 B2 * | 6/2011 | Sakai et al. | ................... | 356/369 |
| 8,332,183 B2 * | 12/2012 | Tung et al. | ................... | 702/172 |
| 2007/0229846 A1 * | 10/2007 | Blalock | ......................... | 356/503 |
| 2010/0214555 A1 * | 8/2010 | Schmitt et al. | .................. | 356/72 |
| 2011/0188056 A1 * | 8/2011 | Muto | ............................ | 356/630 |
| 2011/0299098 A1 * | 12/2011 | Furuya | ......................... | 356/632 |
| 2013/0003063 A1 * | 1/2013 | Headley et al. | ............... | 356/402 |

* cited by examiner

*Primary Examiner* — Michael A Lyons
*Assistant Examiner* — Shawn Decenzo
(74) *Attorney, Agent, or Firm* — Lee & Hayes, PLLC

(57) ABSTRACT

This disclosure describes providing techniques to measure caliper of the paper material. A system may include a first laser head that is disposed above a reference located along an edge of a roll to and a second laser head that is disposed above a top surface of paper material on a roll. The first laser head measures a first distance from the first laser head to the reference located along the edge of the roll. The second laser head measures a second distance from the second laser head to the top surface of the paper material. The system performs calculations for caliper, T, by subtracting the second distance from the first distance, to be the caliper of the paper material. The system also records and creates graphs of the caliper measurements.

21 Claims, 9 Drawing Sheets

LASER CALIPER MEASUREMENT OF PAPER MATERIAL

BACKGROUND

The papermaking process includes providing pulp in a water solution along with adding various additives to form a continuous paper web. A series of operations in the papermaking process will transform the paper web into a finished product. The finished product may be used for paper, checks, notebooks, corrugated box, paper bag, packaging, paper board, cardboard, posterboard, or other applications.

During the papermaking process, on-line measurements of properties of paper material are taken to ensure the quality of the product. For instance, the on-line measurements may include basis weight, moisture content, caliper (i.e., thickness), and the like. The thickness of the paper material may be a predictor of strength, which influences stiffness in the finished product. Also, the thickness of the paper material may affect print quality on the finished product.

There are many methods currently used for measuring the caliper of the paper material. For instance, one method is to measure the caliper of the paper material by contacting devices. The contacting devices tend to place a contacting shoe along a top surface of the paper material. Unfortunately, there is a tendency for the contacting shoe to leave blemishes in the paper material or to cause flaws or tears in the paper material. Also, the contacting shoe may be affected by buildup of contaminants on contacting sensors, which requires constant maintenance of wiping and cleaning the contacting sensors of the contacting devices. Furthermore, the contacting sensors tend to wear out after time.

Another method is to measure the caliper of the paper material by non-contacting devices. The non-contacting devices may avoid the buildup of contaminants but face other problems. Some of these non-contacting devices use one laser source, which does not accurately measure the caliper due to the paper material moving towards the laser source. Other techniques may use two laser sources, one located on each side of the web. However, these techniques may also not be very accurate or have measurement errors if the web is not perpendicular to an incident laser light or the web experiences vibrations.

SUMMARY

This disclosure describes providing techniques to measure caliper of the paper material. A system may include a first laser head that is disposed above a reference located along an edge of a roll to and a second laser head that is disposed above a top surface of paper material on a roll. The first laser head measures a first distance from the first laser head to the reference located along the edge of the roll. The second laser head measures a second distance from the second laser head to the top surface of the paper material. The system performs calculations for caliper, T, by subtracting the second distance from the first distance, to be the caliper of the paper material. The system also records and creates graphs of the caliper measurements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes systems and techniques for measuring caliper of the paper material, which includes non-limiting implementations. The systems and techniques may be used for measuring caliper of other materials, including but not limited to metals, forms of plastic polymers, woods, and the like. A laser caliper system is described that provides caliper measurements without contacting the paper material. This non-contacting measurement system avoids creating tears in the paper material, avoids buildup of contaminants on the contacting sensors, and avoids leaving marks or residues on the paper material.

The laser caliper system uses a combination of at least two laser heads, a control unit, and a computer. The laser caliper system positions the two laser heads to continuously measure distances based on a principle of laser triangulation. The laser caliper system uses the control unit to activate the two laser heads. One of the laser heads measures a first distance from the first laser head to a reference without any paper material. While the other laser head simultaneously measures a second distance from the laser head to the paper material. Next, the control unit calculates the caliper based on subtracting the second distance from the first distance.

The laser caliper system may also be used to detect characteristics or flaws of the paper material. The characteristics may include smoothness or flatness of the paper material. For instance, print quality may be affected if the surface of the paper material is not smooth, such as when coating is not being applied uniformly to the paper material. The ink or the design would not be distributed evenly on a non-smooth coated paper material. The flaws may include irregularities and surface roughness. For instance, the laser caliper system may detect some flaws based on the measured caliper of the paper material. For instance, there may be tolerances identified and any caliper measurements of the paper material that are outside the tolerances may be determined to be unacceptable.

While aspects of described techniques can be implemented in any number of different computing systems, environments, and/or configurations, implementations are described in the context of the following the example computing environment.

Illustrative Environment

Figure 1:
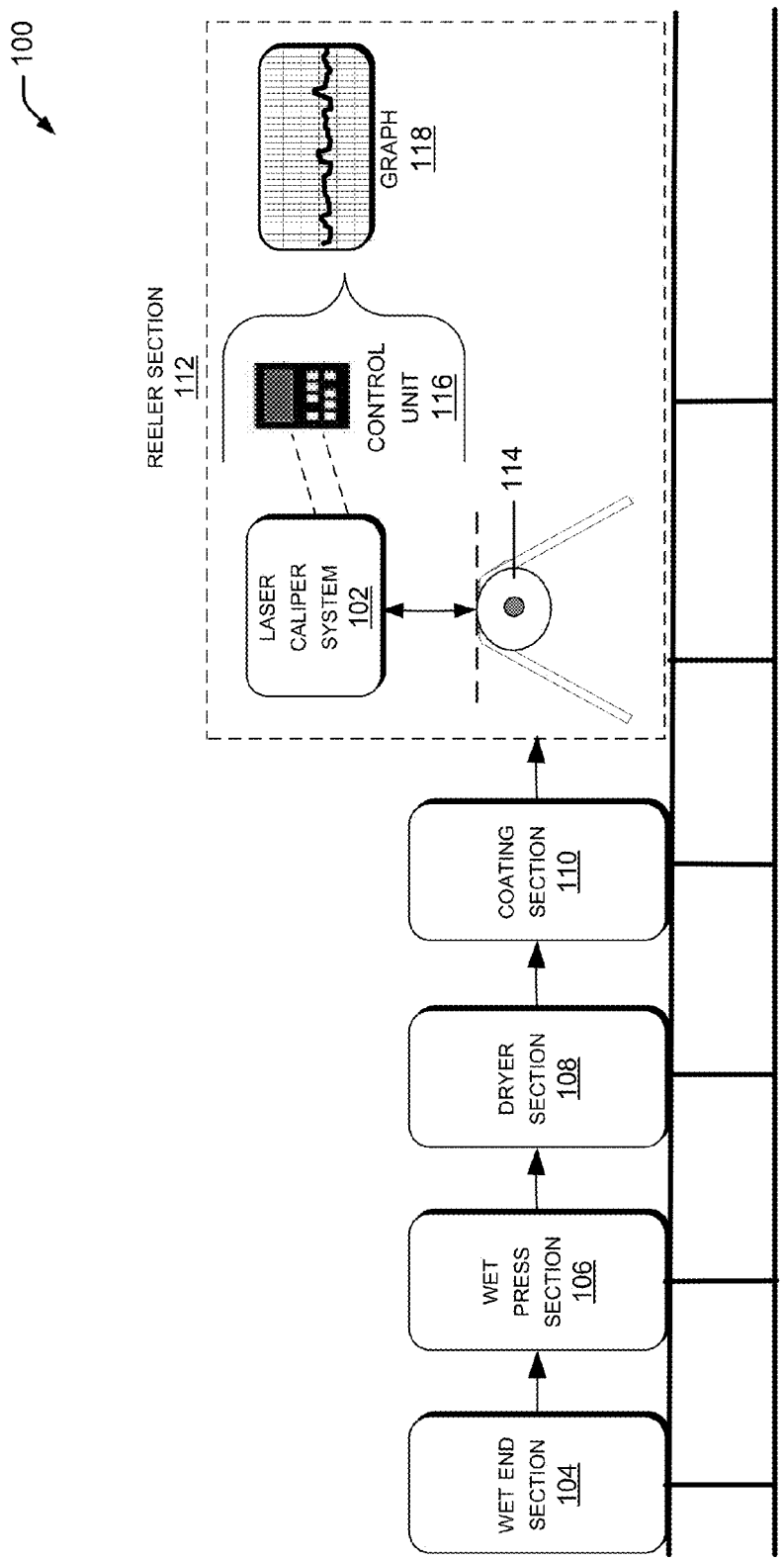
FIG. 1 illustrates an example environment for implementing a laser caliper system.

FIG. 1 illustrates an example paper processing environment 100, usable to implement the laser caliper system 102. The laser caliper system 102 calculates the caliper of the paper material, which includes but is not limited to, non-coated paper, coated paper, paper board, or paper web. The laser caliper system 102 may be included either in-line as part of the paper making process or off-line as part of unrolling a stock roll and fed into another process.

The environment 100 illustrates example paper making processes, that are known in the art, such as the wet end section 104, the wet press section 106, the dryer section 108, and the coating section 110. For example, the laser caliper system 102 may be positioned before and/or after the coating section 110. When the laser caliper system 102 is positioned before the coating section 110, a laser head (not shown) of the laser caliper system 102 measures distances from the laser head to the non-coated paper or paperboard. Shown here, the laser caliper system 102 may be positioned after the coating section 110, at a reeler section 112. Here, the laser heads of the laser caliper system 102 measure simultaneously a first distance from one laser head to the reference and a second distance from the second laser head to the coated paper or coated paperboard. The paper material may located on a roll 114 and one of the laser heads of the laser caliper system 102 may be positioned in a vertical position above the roll 114.

The laser caliper system 102 may further include the control unit 116, which activates the laser heads to emit laser signals at certain time intervals. For instance, the control unit 116 may be set to activate the laser signals, which causes a sampling rate based on an identified frequency and a length of duration. The control unit 116 may be further connected to a computing device (not shown). Thus, the laser heads of the laser caliper system 102 measure the distances to the reference and to the paper material on the roll 114. The control unit 116 then performs a calculation for the caliper of the paper material. The control unit 116 may operate in conjunction with the computing device (not shown) to produce graph(s) 118 of the caliper measurements. The graph(s) 118 provide visual representations of the quality of the paper material based on caliper, i.e., thickness.

Figure 2:
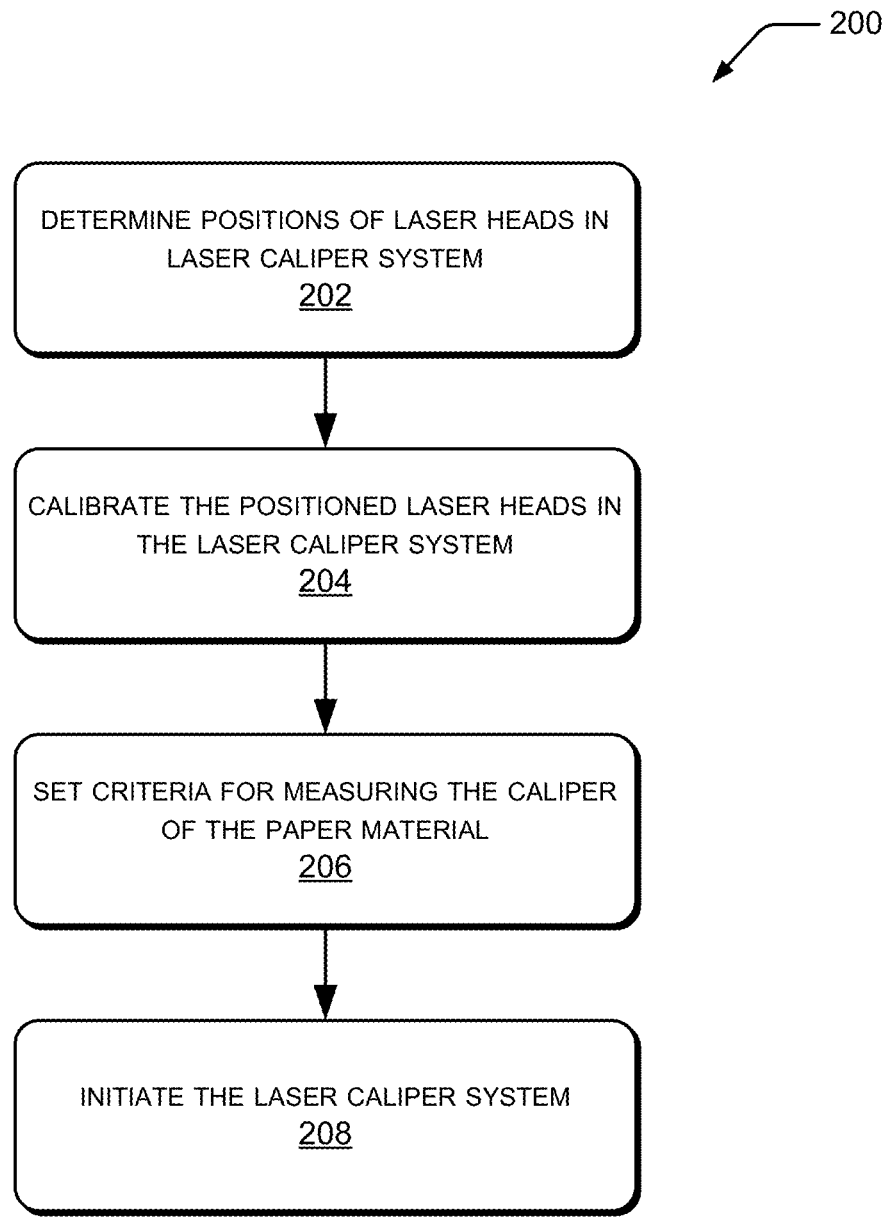
FIG. 2 illustrates an example of high-level functions in setting up the laser caliper system in the environment of FIG. 1.
Figure 5:
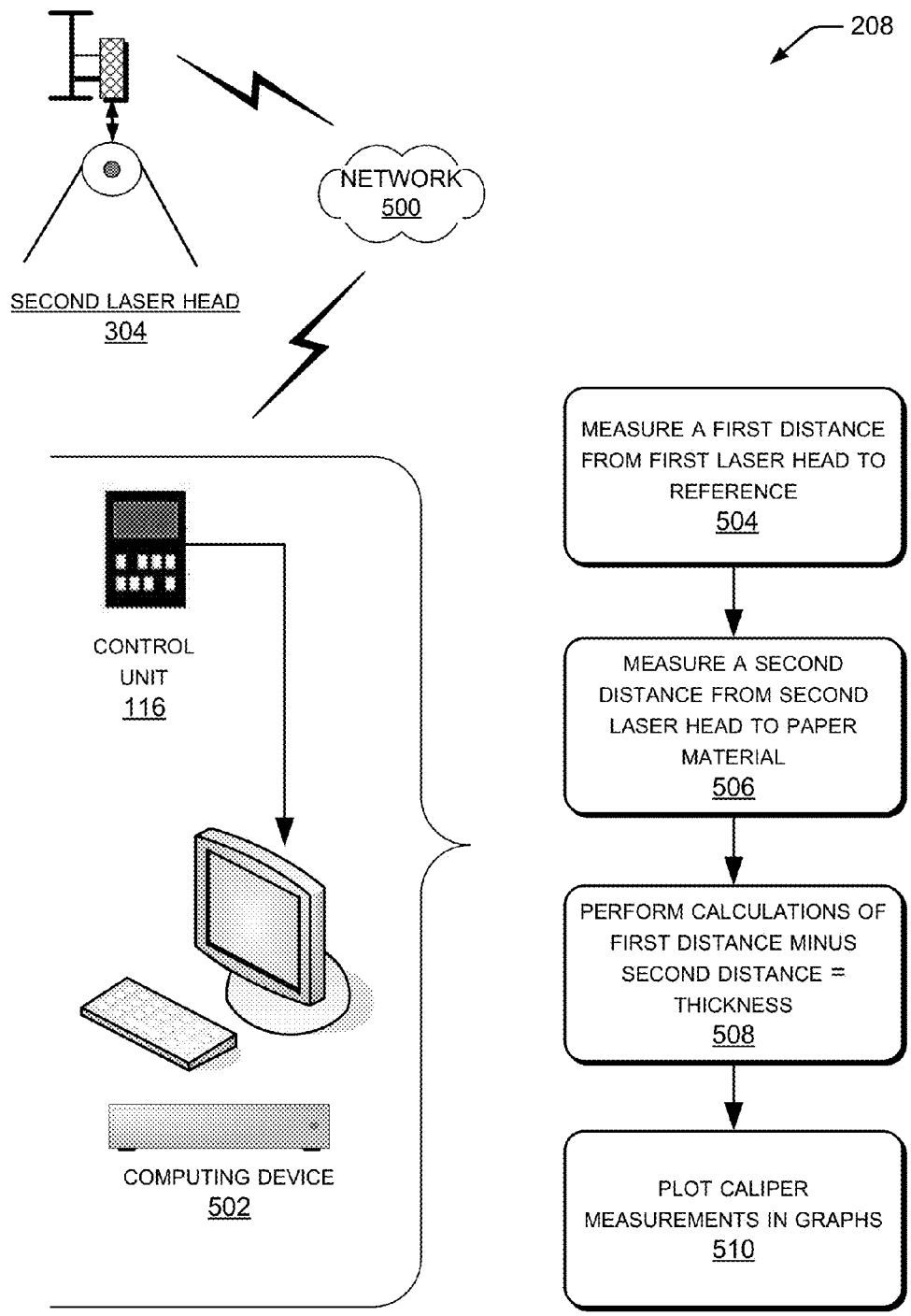
FIG. 5 illustrates an example of functions performed by the laser heads with the control unit of the laser caliper system.

FIGS. 2 and 5 include flow diagrams showing example processes. The processes are illustrated as a collection of blocks in logical flowcharts, which represent a sequence of operations that can be implemented in hardware, software, or a combination. The processes may be performed using different environments and devices. The process as shown as separate steps represented as independent blocks in the figures. However, these separately delineated steps should not be construed as necessarily order dependent in their performance. Any number of the described process blocks maybe be combined in any order to implement the method, or an alternate method. Moreover, it is also possible for one or more of the provided steps to be omitted.

FIG. 2 is a flow diagram showing an example process 200 showing high-level functions in setting up the laser caliper system 102. The process 200 may be divided into four phases. All of the phases may be used in the environment of FIG. 1, may be performed separately or in combination, and without any particular order.

The first phase 202 is to determine positions of the laser heads in the laser caliper system 102. The laser heads of the laser caliper system 102 may be positioned in a variety of locations on-line or off-line to measure paper web, non-coated paper, coated paper, or paperboard. Furthermore, the specific locations of where the laser heads may be placed may vary, depending on the implementations.

The second phase 204 is to calibrate the positioned laser heads in the laser caliper system 102. In an implementation, without having a sheet present on the roll 114, a measurement differential of the two laser heads may be adjusted to zero initially. For instance, a paper sample with a known caliper from a laboratory measurement may be placed under a second laser head and the measurement differential may be adjusted to represent the caliper of the paper sample. Two other samples with known calipers from the laboratory measurements (e.g., a low caliper and a high caliper) may be placed under the second laser head to verify calibration and sensor laser integrity.

The third phase 206 is to set criteria for measuring the caliper of the paper material. The measurements of the distances from the laser heads to the reference and to the paper material may occur at a sampling rate based on a frequency of 1200 microseconds and a duration of 200 microseconds. Also, the control unit 116 may be configured to identify tolerances of upper and lower thresholds for the caliper, as well as configured to set alerts or alarms when the measurements are outside or exceeds the thresholds.

The fourth phase 202 is to initiate the laser caliper system 102. For instance, the control unit 116 activates the laser heads to simultaneously emit laser signals to measure the distances from the laser heads to the reference and to the paper material. Based on the criteria set, the sampling rate may be taken on based on a frequency of 1200 microseconds and a duration of 200 microseconds.

Illustrative Laser Caliper System

Figure 3:
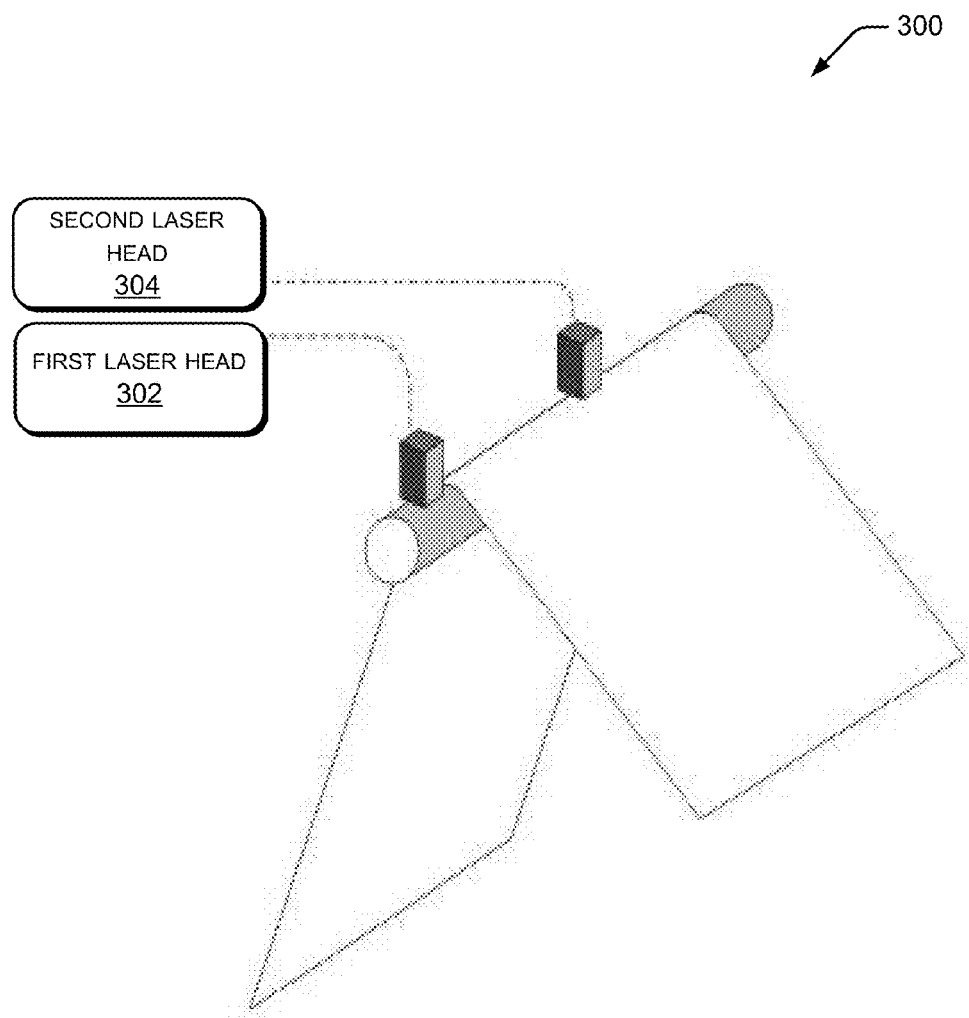
FIG. 3 illustrates an example of a perspective view of a first laser head and a second laser head.

FIG. 3 illustrates an example of a perspective view 300 of the first laser head 302 and the second laser head 304. The laser caliper system 102 illustrates the first laser head 302 is positioned over the reference, which is a surface located on an edge of the roll 114 without any paper material. In this position, the first laser head 302 measures the distance from the first laser head 302 to the reference. The second laser head 304 is positioned above the top surface of the paper material on the roll 114. In another implementation, the first laser head 302 may be mounted on a bracket while the second laser head 304 may be mounted on another bracket.

Figure 4:
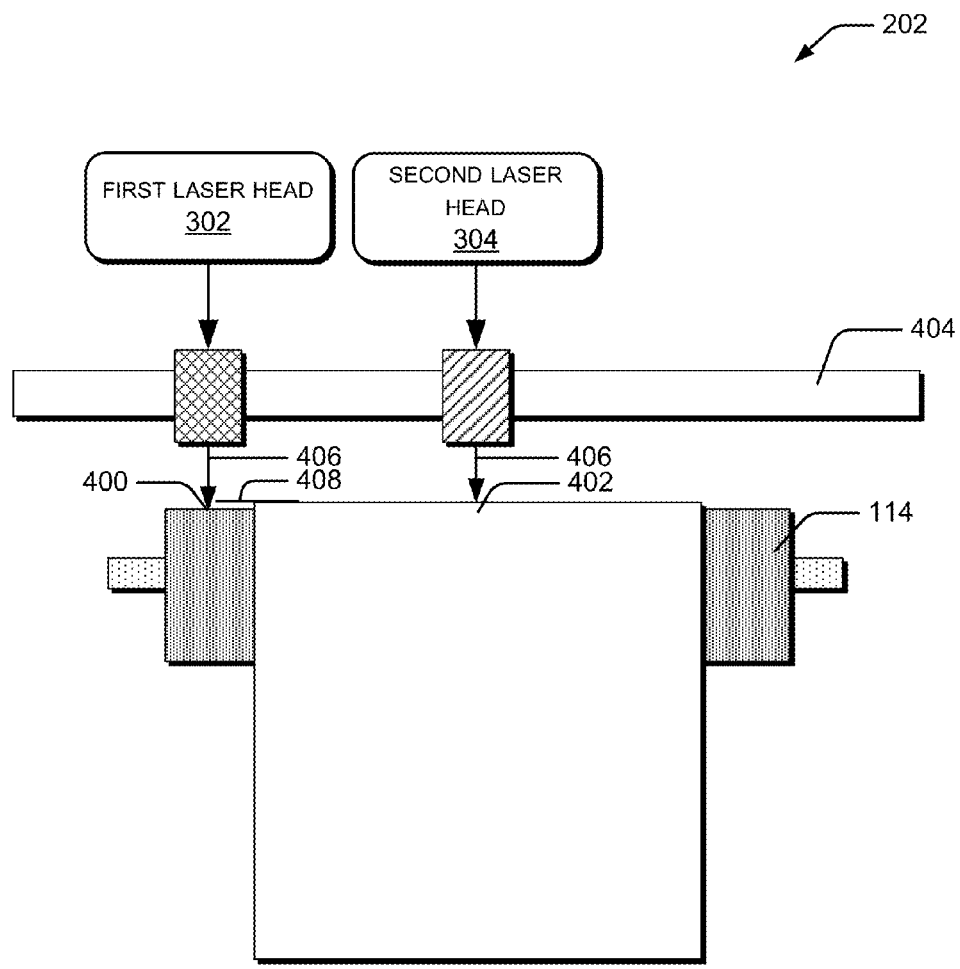
FIG. 4 illustrates an example of a front view of positions of the first laser head and the second laser head.

FIG. 4 illustrates the first phase 202 (discussed at a high level above) of determining the positions of the laser heads in the laser caliper system 102. FIG. 4 illustrates an example front view of the first laser head 302 being positioned over a surface of the reference 400 and the second laser head 304 being positioned over a top surface of the paper material 402 on the roll 114.

The first laser head 302 may be mounted on a rail 404 that is positioned parallel to the roll 114. The rail 404 is positioned directly above the reference 400. In an implementation, the second laser head 304 may be mounted on the same rail 404. The laser heads 302, 304 being mounted on the rail 404 instead of on the paper machine, may help to reduce the vibrations and reduce the measurement errors for caliper.

The second laser head 304 may be positioned directly above a center location of the paper material 402 located on the roll 114. For instance, the first laser head 302 may be positioned approximately 50 millimeters (mm) or approximately 2 inches above the reference 400. In other implementations, the first laser head 302 may be positioned approximately 20 millimeters to less than 50 millimeters above the reference 400. In another implementation, the second laser head 304 may be positioned approximately 50 millimeters or approximately 2 inches above the top surface of the center location of the paper material 402. In some implementations, the second laser head 304 may also be positioned from approximately 20 millimeters to less than 50 millimeters above the top surface of the center location of the paper material 402. In other implementations, the second laser head 304 may be positioned to the right or to the left of the center location of the paper material 402 on the roll 114.

In another implementation, the first laser head 302 may be mounted on a first bracket or a first rail that is positioned directly above the reference 400. The second laser head 304 may be mounted on a second bracket or a second rail that is positioned above the paper material 402. Mounted on the second bracket or the second rail, the second laser head 304 may be positioned over the top surface of the center location, to the right or to the left of the center location of the paper material 402 on the roll 114.

The positions of the first laser head 302 and the second laser head 304 may be spaced approximately 20 to approximately 130 millimeters (mm) apart or from each other. The distances of the laser heads being spaced apart may be based on the width of the paper material. Some paper material may range in width from 1500 mm to 2290 mm (60 to 90 inches), while others may be narrower or wider.

In an implementation, the first laser head 302 may be positioned on the rail 404 above the reference 402 and the second laser head 304 may be located on the rail 404 at a distance of approximately 25.4 mm or approximately one inch away from the first laser head 304. In this implementation, the second laser head 304 would be positioned closer to the first laser head 302 than the center location, that is, being positioned to the left of the center location of the paper material 402.

In another implementation, the first laser head 302 may be positioned on the rail 400 above the reference 402 and the second laser head 304 may be located on the rail 404 at a distance of approximately 50.8 mm or approximately two inches away from the first laser head 304. Here, the second laser head 304 may be positioned approximately above the center location of the paper material 402 that has a width of approximately 2133 mm.

In yet another implementation, the first laser head 302 may be positioned on the rail 404 above the reference 402 and the second laser head 304 may be located on the rail 404 at a distance of approximately 76.2 mm or three inches away from the first laser head 304. Here, the second laser head 304 may be positioned approximately to the right of the center location of the paper material 402 on the roll 114.

In yet another implementation, the first laser head 302 may be positioned on the rail 404 above the reference 402 and the second laser head 304 may be located on the rail 404 at a distance of approximately 101.6 mm or four inches away from the first laser head 304. Here, the second laser head 304 may be positioned approximately to the right of the center location of the paper material 402 on the roll 114.

The first laser head 302 and the second laser head 304 are mounted such that their laser beams 406 are approximately perpendicular to the machine-direction axis or perpendicular to the reference 400 or to the surface of the paper material 402. The axis of the laser beams 406 of the first laser head 302 and the second laser head 304 tend to be collinear, that is mounted collinear on the rail 404.

The control unit 116 performs the calculation for the caliper, T, shown as 408. The calculation occurs by subtracting the second distance B from the first distance A. The first distance is measured from the first laser head 302 to the reference 400 and the second distance is measured from the second laser head 304 to the top surface on the paper material 402.

FIG. 5 illustrates the fourth phase 208 (discussed at high level above) of initiating the laser caliper system 102. The second laser head 304 and the roll 114 are shown in a side view at a top left side of the figure. The laser heads 302, 304 may communicate with the control unit 116 through a wireless network 500 or through a wired interface. For instance, the computing unit 116 and the laser heads 302, 304 may be connected in a wireless or wired network, such as a local area network, a metropolitan area network, a wide area network, and the like.

The control unit 116 may be further connected to a computing device 502. The computing unit 116 and the computing device 502 may be connected in a wireless or wired network, such as a local area network, a metropolitan area network, a wide area network, and the like. The control unit 116 may be wired by analog signal, such as 4 to 20 MilliAmp (mA) to the computing device 502. Basically, the control unit 116 regulates the flow of power to the lasers in the first laser head 302 and in the second laser head 304. One serial interface that may be used with the control unit 116 is RS-232 with baud rate up to 115,200 bits per second (bps), which is a series of standards for serial binary single-ended data and control signals for connecting computer serial ports. Other serial interfaces that may be used include RS-422, RS-423, and the like. Another option may include using an Ethernet physical layer. Several magnitudes of speed may be used and the forms of the Ethernet used may include, but not limited to, 10BASE-T, 100 BASE-TX, or 1000BASE-T. Another option is to use DeviceNet, a network system to interconnect the control unit 116 to the computing device 502.

A process flow chart is shown along the right side of the diagram. At 504, the first laser head 302 measures the first distance A, from the first laser head 302 to the top surface of the reference 400 located along the edge of the roll 114. The control unit 116 activates the first laser head 302 by sending electrical power at different timing intervals.

At 506, the second laser head 304 simultaneously measures a second distance B, from the second laser head 304 to the top surface of the paper material 402 located on the roll 114. The two distances, A and B, are taken approximately about the same time to ensure an accurate thickness determination.

At 508, the control unit 116 performs calculations for thickness, T, by subtracting the second distance, B from the first distance, A, to be the thickness of the paper material 402. For instance, the thickness of the paper material 402 may be represented by: T=(A−B). The control unit 116 activates the laser heads 302, 304 to emit laser beams in a path to the top surface of the paper material 402 and in another path to a surface of the reference 400. The laser heads 302, 304 receive reflective lights from the top surface of the paper material 402 and the top surface of the reference 400 to measure the distances of the emitted laser beams. Details of the operations of the laser head are discussed with reference to FIG. 6.

At 510, the control unit 116 in combination with the computing device 502 may plot the caliper measurements in graph(s) 118. The graph(s) 118 provide a visual representation of the caliper data for the paper material 402 that is collected at different time intervals, such as hours or days. Example graphs 118 are discussed with reference to FIG. 7.

Illustrative Laser Head

Figure 6:
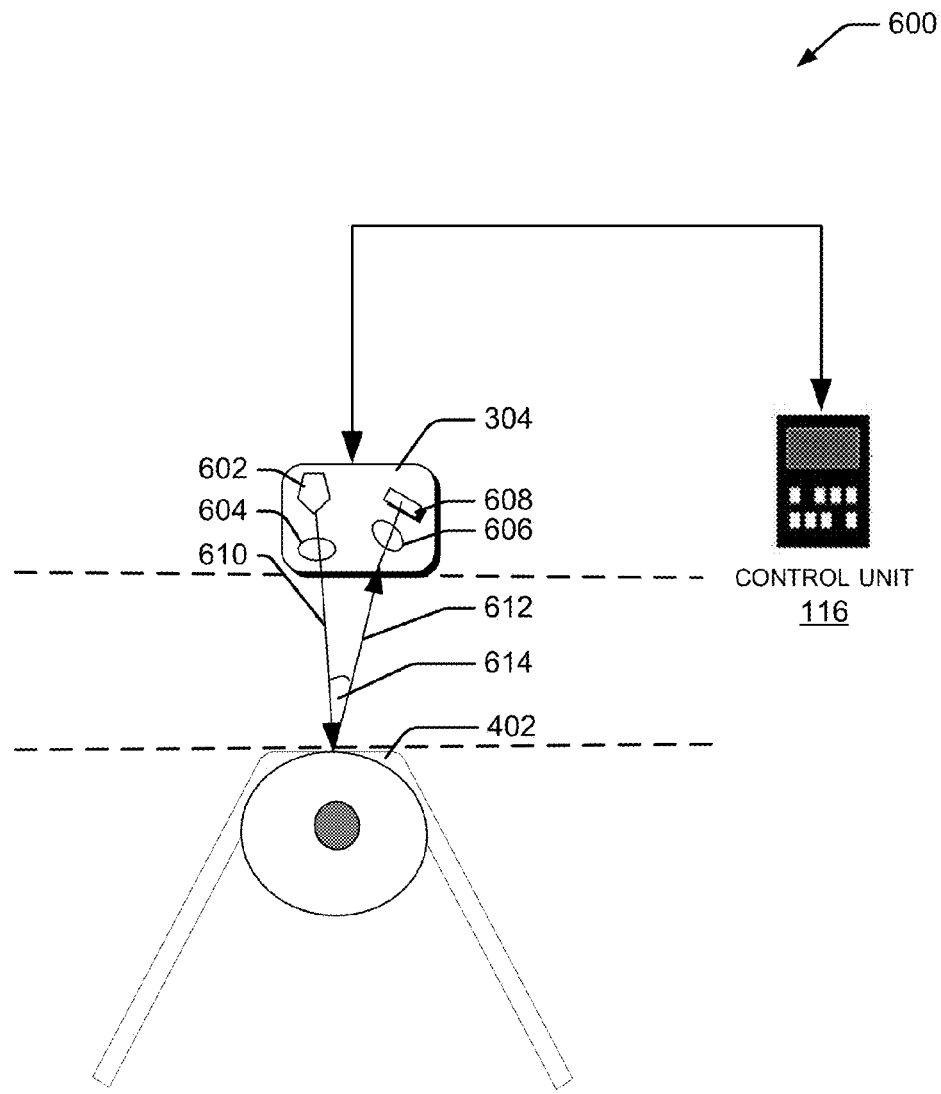
FIG. 6 illustrates an example side view of the second laser head.

FIG. 6 illustrates an example side view 600 of the second laser head 304. For convenience, only the second laser head 304 will be described in detail, as the first laser head 302 will include similar components as the second laser head 304. The first laser head 302 and the second laser head 304 are laser displacement sensors applying the principle of triangulation. In an implementation, the laser heads may be commercially available types of laser heads manufactured by Keyence Corporation of America. The second laser head 304 includes a semiconductor laser 602, a transmitter lens 604, a receiver lens 606, and a light-receiving element 608.

The semiconductor laser 602 is also known as a diode laser or an injection laser. The semiconductor laser 602 is a diode to be activated by the control unit 116 supplying a suitable electrical power. For illustration purposes, the semiconductor laser 602 is represented in a pentagon form, but may be in any form or shape. The semiconductor laser 602 generates a modulated laser beam 610 that is projected onto a point on the top surface of the paper material 402. The laser beam 610 may be infrared light pulses, which may have a wavelength of approximately 650 nanometers (nm) and an output of power approximately 0.90 to 0.95 milliwatt (mW). The semiconductor laser 602 may emit a distance ranging from approximately 40 mm to approximately 60 mm. The laser head distance from the paper material 402 may be adjusted to achieve a measuring range of ±10 mm with a sampling cycle range changing (e.g., from 2.55 microseconds (μs) to 10 μs) to achieve a desired signal resolution.

The laser beam 610 or incident radiation projected from the semiconductor laser 602 illuminates the point on the top surface of the paper material 402. The point illuminated may range in size of approximately 50 micrometers (μm)×2000 μm. The laser beam 610 may be converted into a diffuse reflected light 612, which reflects the radiation from the top surface to the receiver lens 606. The amount of light reflected 612 back from the top surface may be determined by a reflection coefficient based on the material. Darker materials tend to have a lower reflection coefficient while lighter material have a higher reflection coefficient. The receiver lens 606 focuses the diffuse reflected light 612 onto the light-receiving element 608. In an implementation, the receiver lens 606 may be an Ernostar high-speed lens. The light-receiving element 608 generates an electrical receiver signal by converting the diffuse reflected light 612 into electrons. The light-receiving element 608 may be a silicon charge-coupled device (CCD) image sensor or a Complementary Metal Oxide Semiconductor (CMOS) sensor.

The distance from the second laser head 304 to the point on the top surface of the paper material 402 may change. For instance, an angle 614 of the diffuse reflected light 612 passing through the receiver lens 606 may also change based on the distance. As a result of the distance changing, the diffuse reflected light 612 focuses on a different position of the light-receiving element 608. Other factors that may affect the angle 614 include the layout of the components in the second laser head 304. For instance, the angle 614 may vary in terms of degrees, depending on the distance of the laser head 304 to the paper material 402. The angle 614 that may occur remains somewhat consistent during the process. Some angle measurements may occur in the lower ranges of 10 to 20 degrees (e.g., 15 degrees) in the middle ranges of 21 to 30 degrees (e.g., 30 degrees), and in the upper ranges of 31 to 50 degrees (e.g., 35 degrees, 40 degrees, etc.). In an implementation, the laser head 304 may be placed approximately two inches above the paper material 402 such that the angle 614 may be approximately 30 degrees.

The control unit 116 may adjust the laser light intensity according to a target. The control unit 116 controls the laser emission time, wavelength frequency of 600 to 650 nanometers (nm) and laser power of approximately 0.90 to 0.95 milliwatt (mW). Multiple laser heads may be attached to the control unit 116. In this implementation, only two laser heads are used. However, the laser caliper system 102 may include multiple laser heads to be used in the process.

In an implementation, the semiconductor laser 602 generates the laser beam 610 about 50 mm onto the point on the top surface of the paper material 402. The diffuse reflected light 612 forms an angle of approximately 30 degrees passing through the receiver lens 606. The light-receiving element 608 converts the diffuse reflected light 612 into electrical receiver signals. The electrical receiver signals may be generated from the first laser head 302 and from the second laser head 304. The control unit 116 processes the electrical receiver signals to convert into distances. The control unit 116 uses a signal conversion process based on the relationships and principles of triangulation. The control unit 116 performs the calculations to determine the caliper, T of the paper material 402 and further prepares the data for display as well as data output in graphs 118.

Illustrative Graphs

Figure 7:
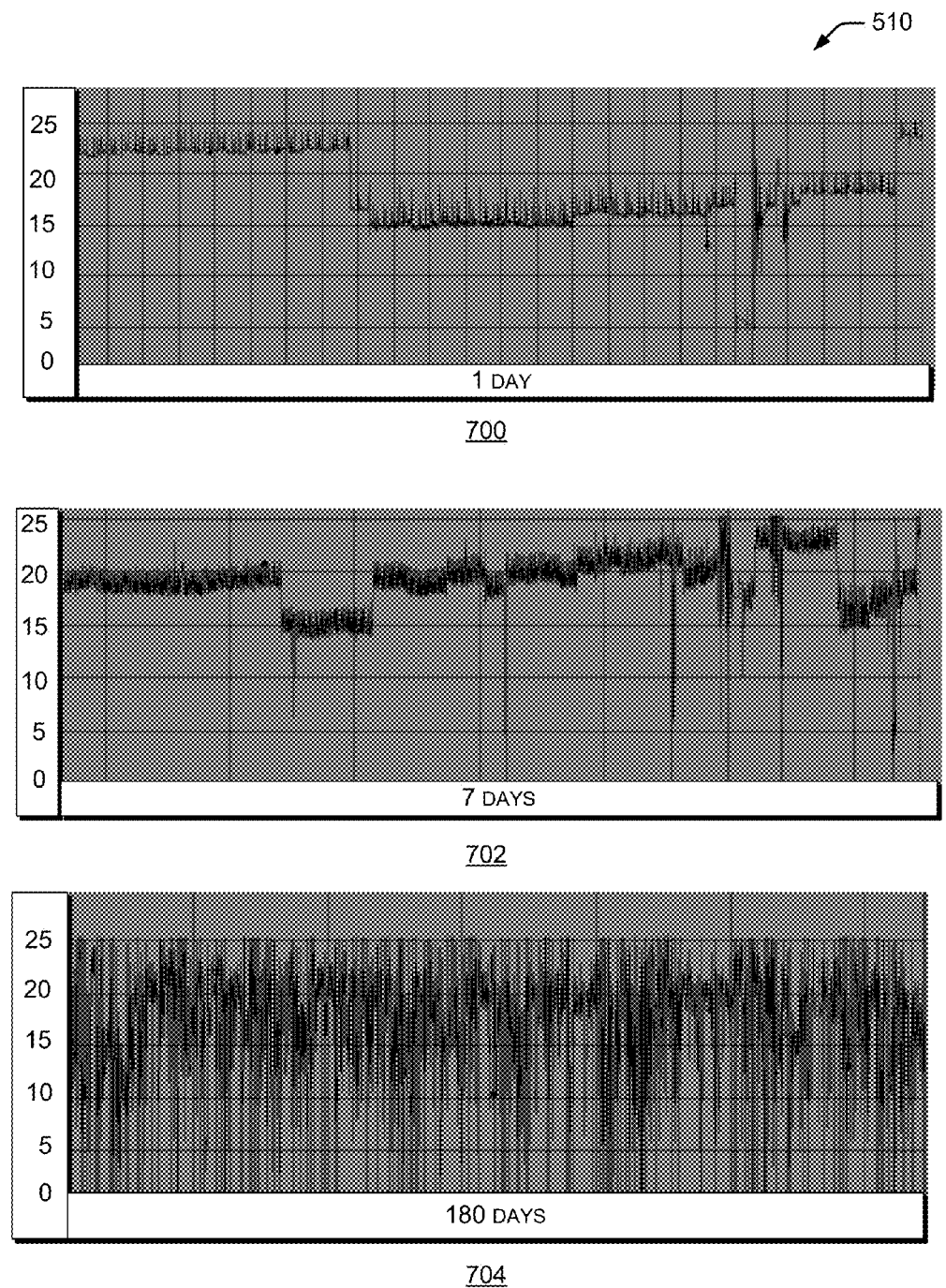
FIG. 7 illustrates examples graphs of measurements of caliper taken for one day, seven days, and 200 days.

FIG. 7 illustrates examples graphs 510 of measurements of caliper taken for one day, seven days, and 200 days. The scale used for the y-axis of the graphs is in mils, or thousandths of an inch. The graphs represent example measurements. The first graph 700 represents a profile of the caliper recorded for one day. The graph 700 is for one day of measurements of the caliper. The chart illustrates the caliper is initially about 23 mils, then moves down to about 16 mils, and then moves back up to about 20 mils.

The graph 702 represents a profile of seven days of measurements. The graph 702 shows the measurements of the caliper, ranging from 15 mils to 24 mils. The graph 704 represents a profile for 180 days of measurements. The graph 704 shows the measurements of the caliper ranging from 10 mils to 24 mils. The profiles for the seven days 702 and for the 180 days 704 appear somewhat similar. These illustrate non-limiting examples of the graphs 118.

In another implementation, the graphs 118 may include the upper threshold and the lower threshold limits. This provides another visual representation of the caliper measurements and any data that may be located outside the threshold ranges.

Illustrative Control Unit

Figure 8:
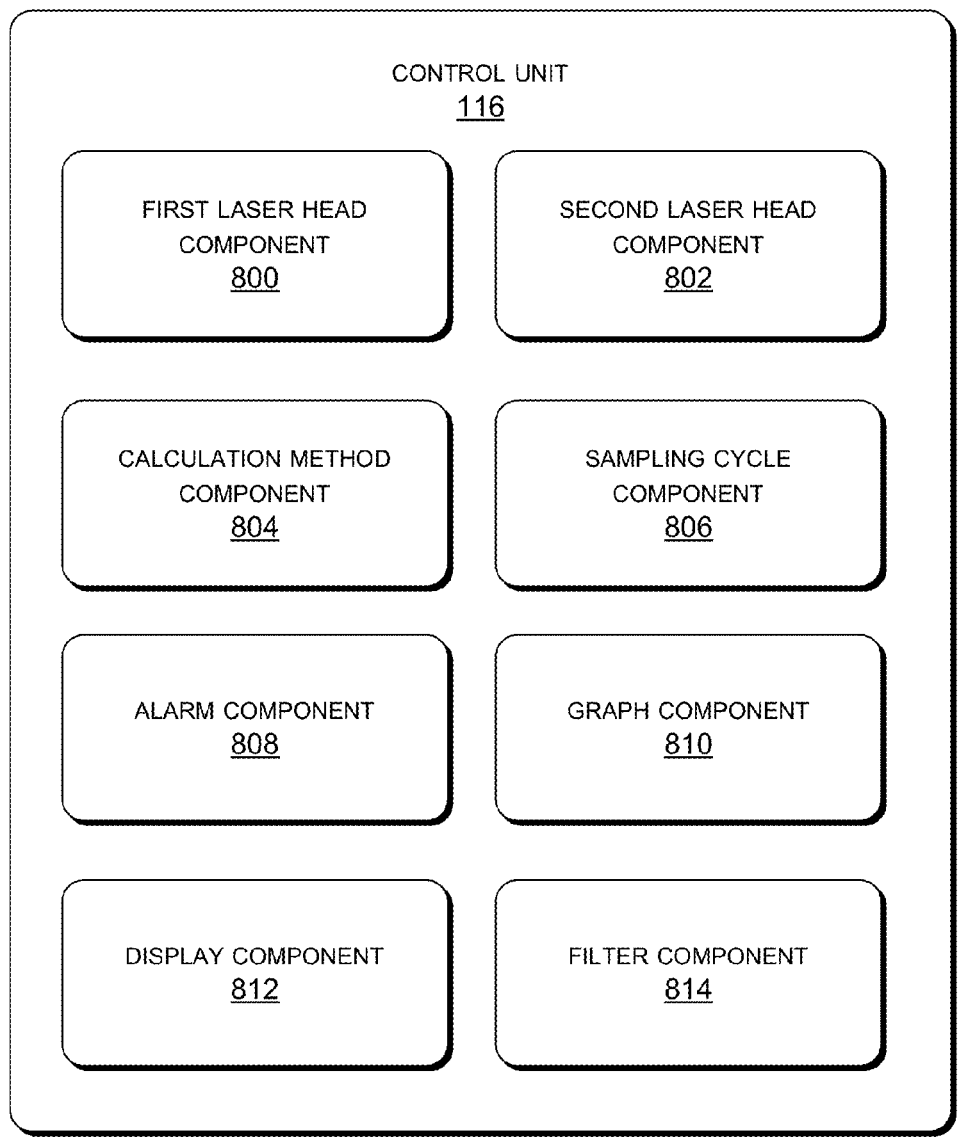
FIG. 8 illustrates example components in the control unit used in the implementation of the laser caliper system.

FIG. 8 illustrates example components in the control unit 116 used in the implementation of the laser caliper system 102. The components may include a first laser head component 800, a second laser head component 802, a calculation method component 804, and a sampling cycle component 806. The first laser head component 800 and the second laser head component 802 activates the laser heads 302, 304 to emit laser beams in a path to the top surface of the paper material 402 and in another path to a surface of the reference 400. The first laser head component 800 and the second laser head component 802 also receive reflective lights from the top surface of the paper material 402 and the top surface of the reference 400 to measure the distances of the emitted laser beams. The calculation method component 804 performs calculations for thickness, T, by subtracting the second distance B from the first distance A, to be the thickness of the paper material 402. For instance, the thickness of the paper material 402 may be represented by: $T=(A-B)$. The sampling cycle component 806 may measure characteristics or caliper of the paper material set at different intervals, based on time intervals in minutes or hours. In an implementation, the sampling cycle component 806 may measure caliper every hour.

The control unit 116 also includes an alarm component 808, a graph component 810, a display component 812, and a filter component 814. The alarm component 808 may be set for sending alerts, establishing the thresholds, a lower threshold limit, and an upper threshold limit. The alarm component 808 may determine if the caliper of the paper material exceeds the upper threshold and/or the lower threshold. If the caliper measurements are outside the threshold limits, the alarm component 808 may set an alarm in a form including but not limited to, a flashing signal online, a flashing display on a monitor, or an audible sound. A technician may make adjustments if needed. The graph component 810 may work in conjunction with the computing device 502 to produce the non-limiting example graphs as shown in FIG. 7. The display component 812 displays the measurement modes, ranges, settings, boundaries, alarms, calculation methods, distances, tolerances, hysteresis, sampling cycle, number of laser heads being used, strobe time, analog channel used, control unit settings, Ethernet address, IP address, and the like. The filter component 814 may be used to identify moving average measurements, tolerances, and frequency times.

Illustrative Computing Device

Figure 9:
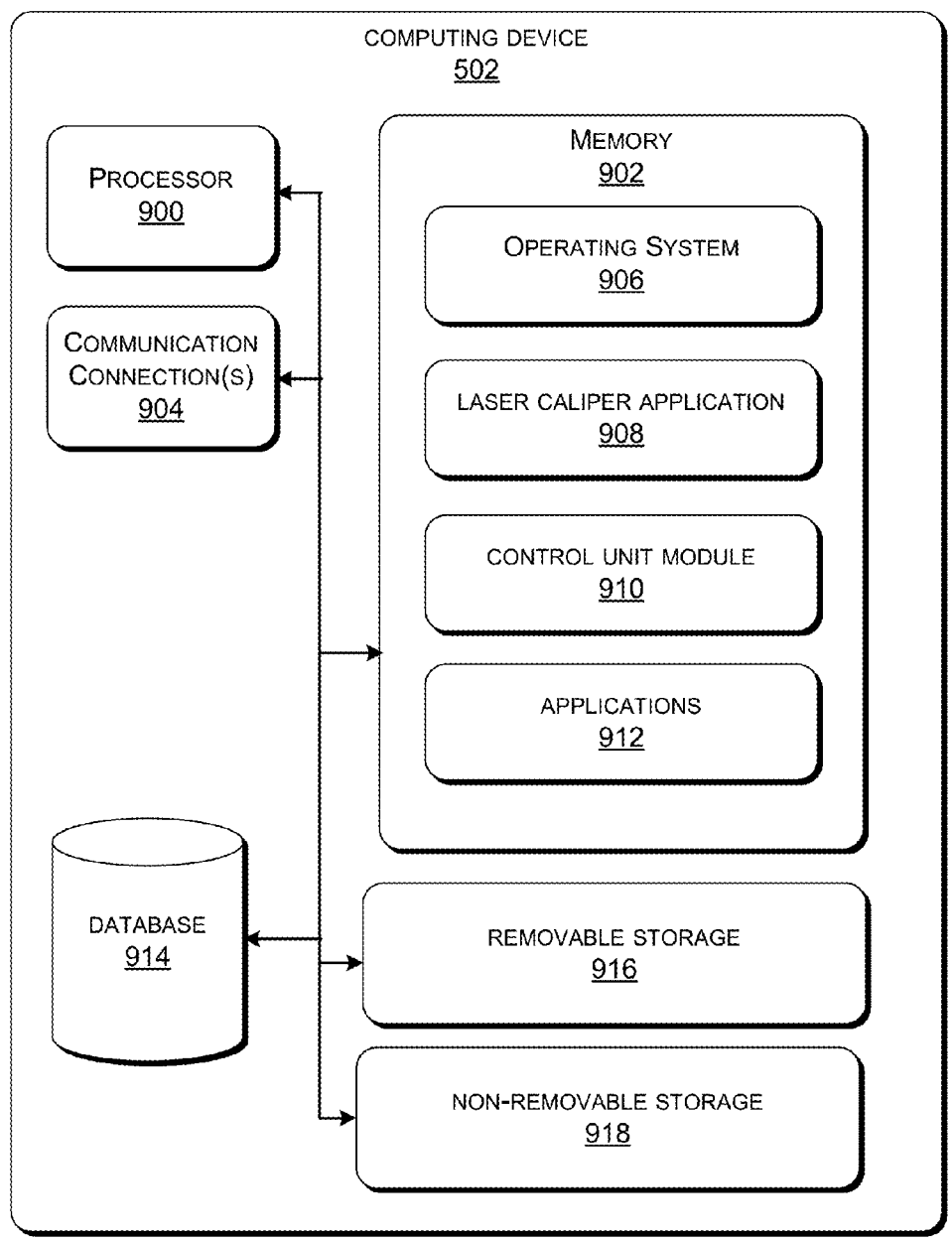
FIG. 9 illustrates an example computing device used with the control unit in the implementation of the laser caliper system.

FIG. 9 illustrates an example computing device 502 used with the control unit 116 in the implementation of the laser caliper system 102. The computing device 502 may be configured as any suitable system capable of services, which includes, but is not limited to, implementing the control unit 116, such as measuring caliper, identifying flaws, and detecting characteristics of the paper material 402. In one example configuration, the computing device 502 comprises at least one processor 900, a memory 902, and a communication connection(s) 904. The communication connection(s) 904 may include access to a wide area network (WAN) module, a local area network module (e.g., Wi-Fi), a personal area network module (e.g., Bluetooth), and/or any other suitable communication modules to allow the computing device 502 to communicate over the network(s) with the control unit 116. For example, the computing device 502 may be a part of, including but is not limited to, a client-server system, a peer-to-peer computer network, a distributed network, an enterprise architecture, a local area network, a wide area network, a virtual private network, a storage area network, and the like.

Turning to the contents of the memory 902 in more detail, the memory 902 may store an operating system 906, a laser caliper application 908, a control unit module 910, and applications 912. The laser caliper application 908 may interact with the control unit module 910 directly. The laser caliper application 908 may provide graphs of the caliper measurements, record the tolerances or thresholds as identified, and calibrate the laser caliper system 102 for different targets or different positions.

The control unit module 910 provides communication to the control unit 116. The control unit 116 performs the procedures that were discussed with reference to FIG. 8.

The memory 902 may also store one or more applications 910 on the computing device 502. For instance, the graphs 118 may be sent via the applications 910, such as email application to other computing devices. In another implementation, the graphs 118 may be included in applications 910, such as spreadsheet for presentations.

The computing device 502 may include a database 914 to store a collection of distances, measurement data, graphs 118, and the like. The computing device 502 may also include additional removable storage 916 and/or non-removable storage 916. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system for measuring caliper of paper material, the system comprising:
    a first laser head that is positioned above a reference that is located along an edge of a roll, the first laser head to project a first incident radiation to the reference and to detect a first reflected radiation from the reference;
    based on the first reflected radiation, the first laser head to measure a first distance from the first laser head to the reference located along the edge of the roll;
    a second laser head positioned above the roll, the second laser head to project a second incident radiation onto a top surface of a roll and to detect a second reflected radiation from the top surface of the roll, the first laser head and the second laser head being positioned in an axis parallel to an axis of the reference and the roll;
    based on the second reflected radiation, the second laser head to measure a second distance from the second laser head to the top surface of the roll; and
    a control unit to calculate the caliper of the paper material.

2. The system of claim 1, wherein the caliper of the paper material is based at least on the control unit subtracting the second distance from the first distance.

3. The system of claim 1, wherein;
    the first laser head is positioned on a first bracket up to approximately 50 millimeters (mm) above the reference that is located along the edge of the roll; and
    the second laser head is positioned on a second bracket up to approximately 50 millimeters (mm) above the top surface of the roll.

4. The system of claim 1, wherein the first laser head and the second laser head are mounted on a rail approximately 50 millimeters (mm) above the reference and the roll, respectively.

5. The system of claim 1, wherein the first laser head and the second laser head are mounted collinear on a rail and separated about 50.8 millimeters (mm) apart from each other.

6. The system of claim 1, wherein the first laser head and the second laser head are mounted collinear on a rail and separated about 77 millimeters (mm) apart from each other.

7. The system of claim 1, wherein the first laser head or the second laser head comprises being configured to measure the first distance or the second distance to approximately 45 millimeters (mm) in distance.

8. The system of claim 1, wherein the control unit is further configured to:
- establish an upper threshold and a lower threshold of caliper of the paper material;
- continue to measure the caliper of the paper material;
- determine if the caliper of the paper material exceeds the upper threshold or the lower threshold; and
- record and graph measurements of the caliper of the paper material shown with the upper threshold and the lower threshold.

9. The system of claim 8, wherein the control unit is further configured to sound an alarm if the measurements of the caliper of the paper material exceed the upper threshold or the lower threshold.

10. The system of claim 1, wherein the first laser head and the second laser head are non-contacting types of displacement sensors.

11. A system comprising:
- a first laser head disposed above a reference located along an edge of a roll to measure a first distance from the first laser head to the reference located along the edge of the roll;
- a second laser head disposed above the roll to measure a second distance from the second laser head to a top surface of the roll, the first laser head and the second laser head being disposed in an axis parallel to an axis of the reference and the roll; and
- a control unit to detect characteristics in paper material by subtracting the second distance from the first distance.

12. The system of claim 11, wherein the control unit is further configured to:
- measure the characteristics of a caliper of the paper material every hour based on subtracting the second distance from the first distance; and
- record and graph measurements of the caliper of the paper material.

13. The system of claim 11, wherein the first laser head is further configured to project a first incident radiation to the reference and to detect a first reflected radiation from the reference to measure the first distance.

14. The system of claim 11, wherein the second laser head is further configured to project a second incident radiation onto the top surface of the roll and to detect a second reflected radiation from the top surface of the roll to measure the second distance.

15. A method of measuring caliper of paper material, the method comprises:
- positioning a first laser head above a reference located along an edge of a web;
- positioning a second laser head above a surface of the paper material on a web, the first laser head and the second laser head being positioned in an axis parallel to an axis of the reference and the surface of the paper;
- measuring a first distance from the first laser head to the reference located along the edge of the web;
- measuring a second distance from the second laser head to the surface of the paper material on the web; and
- calculating the caliper of the paper material subtracting the second distance from the first distance.

16. The method of claim 15, further comprising establishing an upper threshold and a lower threshold of caliper of the paper material.

17. The method of claim 15, further comprising recording and graphing measurements of the caliper of the paper material.

18. The method of claim 15, further comprising:
- determining if the caliper of the paper material exceeds an upper threshold or a lower threshold established for the paper material; and
- recording and graphing measurements of the caliper of the paper material shown with the upper threshold and the lower threshold.

19. The method of claim 15, The method of claim 15, further comprising:
- establishing an upper threshold and a lower threshold of caliper of the paper material;
- measuring the caliper of the paper material;
- determining if the caliper of the paper material exceeds the upper threshold or the lower threshold; and
- setting an alarm if the caliper exceeds the upper threshold or the lower threshold.

20. The method of claim 19, wherein the alarm comprises a flashing light, a flashing display on a monitor, or an audible sound.

21. The system of claim 11, wherein the control unit is further configured to detect characteristics in paper material by identifying paper irregularities and surface roughness.

\* \* \* \* \*